US005350585A

United States Patent [19]

Sunderland

[11] Patent Number: 5,350,585

[45] Date of Patent: Sep. 27, 1994

[54] EXTRUSION PROCESS FOR THE PRODUCTION OF FREEZEABLE BREADING PRODUCT

[75] Inventor: Robert D. Sunderland, Sabetha, Kans.

[73] Assignee: Wenger Manufacturing, Inc., Sabetha, Kans.

[21] Appl. No.: 65,872

[22] Filed: May 21, 1993

[51] Int. Cl.[5] .............................................. A21D 13/00

[52] U.S. Cl. ......................................... 426/19; 426/28; 426/62; 426/549

[58] Field of Search ....................... 426/62, 549, 19, 28

[56] References Cited

U.S. PATENT DOCUMENTS

| | | | |
|---|---|---|---|
| 4,609,557 | 9/1986 | Mao et al. | 426/549 |
| 4,609,558 | 9/1986 | Giacone et al. | 426/549 |

*Primary Examiner*—Joseph Golian

*Attorney, Agent, or Firm*—Hovey, Williams, Timmons & Collins

[57] ABSTRACT

An improved extrusion process is provided for the production of freezeable breadings which can be applied to frozen food products and which essentially eliminates the problem of "frosty tips", i.e., the tendency of prior extruded breadings to exhibit an unappealing whitish color when breaded products were fried or baked. The process of the invention involves first preparing a moisturized breading mixture containing a major proportion of wheat flour, together with water and active yeast; this mixture is then passed into and through an extruder under moderate conditions of temperature, pressure and shear, followed by shredding and drying of the extrudate to a moisture content of from about 8–12% by weight.

4 Claims, 1 Drawing Sheet

EXTRUSION PROCESS FOR THE PRODUCTION OF FREEZEABLE BREADING PRODUCT

BACKGROUND OF THE INVENTION

1. Field of the Invention

The present invention is broadly concerned with an improved process for the low cost extrusion production of breadings which can be applied to frozen foods such as fish and chicken. More particularly, the breadings of the invention eliminate the problem of "frosty tips", or the tendency of extrusion-produced breadings to give an unappealing, whitish appearance when applied to frozen foods which are ultimately baked or fried. The process of the invention involves use of a breading mixture containing flour, water and active yeast which is processed under relatively low temperature, shear, and pressure conditions within an extruder, followed by shredding and drying of the extrudate to yield the desired breadings.

2. Description of the Prior Art

Dry breadings are traditionally applied to a variety of foods such as fish, chicken and pork prior to cooking thereof. Further, such breadings are often applied to uncooked products prior to freezing so that the consumer may directly bake or fry the frozen item without the bother of breading application. Most breading products heretofore used in the context of frozen prepared foods have been traditionally prepared breads which have been shredded to yield breadings. However, breadings of this type are relatively expensive.

Attempts have been made in the past to extrude breadings. When initially applied to food products, such extruded breadings appear to be fully equivalent to their traditional counterparts. However, when such breadings are applied to foods subjected to freezing, the breadings tend to exhibit whitened outer tips when the frozen foods are cooked. This phenomenon is referred to in the art as "frosty tips", and has been the principal reason why food processors have not used the generally less expensive extrusion-produced breadings.

SUMMARY OF THE INVENTION

The present invention overcomes the problems outlined above and provides an improved process for the extrusion production of freezeable breadings which essentially eliminates the "frosty tip" drawback. Broadly speaking, the method of the invention involves first providing a moisturized breading mixture including a major proportion of wheat flour, together with individual amounts of active yeast and water. This mixture is then passed into and through an extruder to create an extrudate, with the extrusion being carried out at temperature and pressure conditions within the extruder barrel of up to about 250° F. and up to about 400 psi, respectively. The extrudate is then dried to moisture content of about 8–12% by weight.

In more detail, the preferred extruder apparatus for use in the invention is a twin screw device including an elongated barrel and a pair of axially rotatable, helically flighted augers situated within the barrel, with an endmost extrusion die. Particularly preferred twin screw extruders are the model TX Wenger extruders described in U.S. Pat. No. 4,875,847, which is incorporated by reference herein. The extrusion die preferably includes a pair of spaced apart die plates positioned at the end of the extruder barrel. Additionally, the overall extrusion apparatus advantageously includes a preconditioner upstream of the extruder for purposes of moisturizing and preliminarily working the mixture entering the extruder. Dual-shaft preconditioners of the type described in U.S. Pat. No. 4,752,139, incorporated by reference herein, are especially preferred.

In carrying out the process of the invention, the initial breading mixture normally contains a major proportion of wheat, i.e., the wheat fraction of the moisturized mixture entering the extruder is at least about 50% by weight. More preferably, this wheat content is from about 75–99% by weight. The water content of the moisturized mixture entering the extruder is typically on the order of 20–35% by weight, and more preferably from about 25–30% by weight. The active yeast content of the moisturized mixture entering the extruder ranges from about 0.1% by weight to a yeast content which would detract from the structure or flavor of the final breading. Usually, the yeast content is from about 0.1–5% by weight, and more preferably from about 0.1–1% by weight. The active yeast can be in the form of commercially available, dried active yeast, or a fermented yeast brew may be employed. Additional ingredients sometimes used in the initial moisturized mixture include salt, dextrose, and surfactants or dough conditioners.

In preferred processing steps, the moisturized breading mixture is created in the preconditioner. This normally involves injection of water into dry ingredients within the preconditioner, with mixing. Generally, the mixture is retained in the preconditioner for a period of up to about 3 minutes (preferably from about 2–3 minutes), with a maximum temperature in the preconditioner of up to about 100° C. (preferably from about ambient temperature to about 100° C.).

At the conclusion of preconditioning, the moisturized breading mixture is directed into the extruder barrel and, during passage therethrough, is subjected to increasing levels of temperature, pressure and shear. However, these conditions are relatively moderate so as to minimize damage to the dough. Generally, the maximum temperature recorded within the barrel should be from about 100°–250° F., and more preferably from about 170°–230° F. Maximum barrel pressures preferably should be in the range from about 100–400 psi. The retention time of the mixture within the barrel should be from about 10–40 seconds, more preferably from about 15–30 seconds. Also, individual sections of the barrel may be heated or cooled via indirect thermal exchange with a circulating medium such as water passing through external jackets on the head sections. Additional moisture can be added to the mixture during extrusion by injection through the barrel.

The extrudate as it emerges from the extruder barrel should have a moisture content on the order of 25–40% by weight, more preferably from about 28–38% by weight. At this point the extrudate is dried, this being preferably carried out by first depositing the extrudate onto a moving belt in order to allow the extrudate to set. (typically for a period of about 5–30 seconds), whereupon the extrudate is cut into segments and then shredded (normally to an average particle size of from about 900–2000 microns). At this point, the shredded extrudate is passed through a multiple stage dryer/-cooler where it is subjected to drying air currents having a temperature of from about 160°–250° F. Such air current drying is normally carried out for a period of from about 10–20 minutes, more preferably from about .5–45 minutes. The resulting breading normally has a bulk density of from about 8–19 lbs/$ft^3$.

DETAILED DESCRIPTION OF THE PREFERRED EMBODIMENTS

Figure 1:
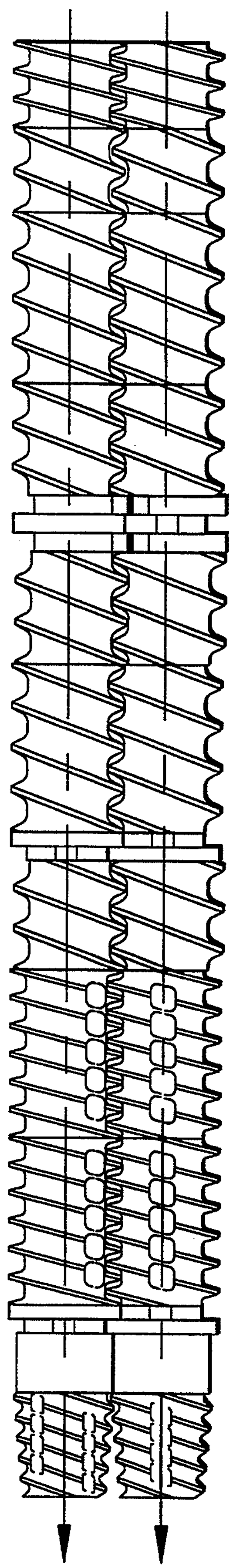
FIG. 1 is a schematic representation of the preferred twin screw configuration used in a Wenger TX twin screw extruder for processing of breadings in accordance with the invention.

The following examples are provided to illustrate the principles and preferred procedures found useful for the production of freezeable breading products. It is to be understood, however, that these examples are given by way of illustration only and nothing therein should be taken as a limitation on the overall scope of the invention.

EXAMPLE 1

In this Example, a number of breadings were prepared and tested in accordance with the present invention. The starting dry ingredients used in these runs consisted of 97.60% by weight flour, 0.50% by weight. Dimodan surfactant, 0.65% by weight dextrose, 1.00% by weight salt and 0.25% by weight active dry yeast. The ingredients were first fed to a Wenger preconditioner where water was added with mixing. The moisturized and preconditioned ingredients were then fed to a Wenger Model TX-80 twin screw extruder in order to cook and expand the mixture under low shear, temperature and pressure conditions.

In more detail, the preconditioner was a Wenger Model MDL 7 DDC, with the small shaft having only one row of paddles while the large shaft includes all paddles. The TX-80 extruder was configured with an inlet head (Part #56616-001), intermediate heads 2–4 (Part #56607-001) and final head (Part #56619-001). The screw configuration is illustrated in the single Figure and includes, in successive order from right to left, Parts Nos. 56626-403, 56695-003, 56625-001, 56625-103, 56624-103F., 56624-101F, 56624-103F., 56625-103R, 56625-003, 56664-101O, 56664-107+, 56625-103R, 56626-007, 56626-007, 56664-101O, 56664-107+and 56687-005. The final die included first and second die spacers (Parts #65370-601 and 74010-077), as well as first backup die (Part #56370-601) with insert (Part #74010-230).

In processing the starting mixture, the dry ingredients were mixed approximately ten times and then fed in serial order through the preconditioner and extruder. A total of three runs were conducted, and the following table sets forth the recorded processing parameters. In the extruder, water was circulated through the jacketed heads for cooling purposes, and this is denoted by the letter "W" in the temperature data. Additionally, water was injected into the extruder barrel.

TABLE 1

| EXTRUDER | | RUN #1 | RUN #2 | RUN #3 |
|---|---|---|---|---|
| RAW MATERIAL INFORMATION | | | | |
| Raw Material Moisture | MCWB | 13.57 | 18.93 | — |
| Feed Screw Speed | RPM | 17.00 | 17.00 | 17.00 |
| PRE-CONDITIONING INFORMATION | | | | |
| Water Flow to Mixing Cylinder | PPM | 1.780 | 1.780 | 1.570 |
| Mixing Cylinder Temperature | °C. | 63.00 | 65.00 | 66.00 |
| EXTRUSION INFORMATION | | | | |
| Extruded Shaft Speed | RPM | 395 | 387 | 433 |
| Motor Load | % | 76 | 79 | 79 |
| Water Flow to Extruder | PPM | 1.520 | 1.480 | 1.370 |
| Control/Temperature 2nd Head | °C. | W/56 | W/67 | W/66 |
| Control/Temperature 3rd Head | °C. | W/102 | W/109 | W/108 |
| Control/Temperature 4th Head | °C. | W/144 | W/148 | W/164 |
| Control/Temperature 5th Head | °C. | W/151 | W/155 | W/168 |
| #4 Head/Pressure | PSIG | 500 | 600 | 500 |
| #5 Head/Pressure | PSIG | 400 | 500 | 400 |
| FINAL PRODUCT INFORMATION: | | | | |
| Extrudate Rate (Wet) | PPH | 950.00 | 950.00 | — |
| Extrudate Density (Dry) | lbs/$ft^3$ | 18.00 | 16.50 | 11.00 |
| Extrudate Density (Wet) | lbs/$ft^3$ | — | 16.50 | 11.00 |

The extrudate products from these runs were first collected on an elongated moving belt to "set" the extrudate; residence time on the belt was approximately 8 seconds. The set extrudate was then cut into convenient: lengths and shredded and screened (1/8' VGR screen, Runs 1 and 2, 3/16" VGR screen, Run 3). The shredded breading was then dried in a Wenger Model 4800 dryer/cooler provided with three sections. The temperature settings in the three zones of the dryer/-cooler were 215° F., 210° F. and 00° F., while the retention time in the zones was 1.5, 1.4 and 0.7 minutes. The bed depths in the first and second passes were 0.1 foot. The fan speeds for the numbers 1, 2 and 3 fans were 1070 rpm. The moisture contents of the products after drying were 7.81%, 9.61% and 7.96% (MCWB).

The resulting breading products were all very acceptable and eliminated the problem of "frosty tips" when applied to a product which was subsequently frozen, defrosted and then fried.

EXAMPLE 2

A further set of breading runs were carried out using the following dry starting ingredients, identified by the respective runs.

TABLE 2

| Run | 4 | 5 | 6 | 7 | 8 | 9 | 10 | 11 |
|---|---|---|---|---|---|---|---|---|
| Wisdom Flour | 97.50 | 92.59 | 92.82 | 97.74 | 96.80 | 89.04 | 95.25 | 95.25 |
| Salt | 1.00 | 1.00 | 1.00 | 1.01 | 1.00 | 0.92 | 4.00 | 4.00 |
| Dextrose | 0.75 | 0.75 | 0.75 | 0.75 | 0.75 | 0.69 | 0.50 | 0.50 |
| Dimodan | 0.50 | 0.50 | 0.50 | 0.50 | — | 0.45 | — | — |
| Active Dry Yeast | 0.25 | 0.25 | — | — | — | — | 0.25 | 0.25 |
| Ethanol | — | 4.91 | 4.92 | — | — | — | — | — |
| Multifarian[1] | — | — | — | — | 1.46 | — | — | — |
| Fermented Brew[2] | — | — | — | — | — | 8.90 | — | — |

[1]Proprietary egg product supplied by the University of Nebraska-Lincoln.

[2]The fermented-brew consisted of 15 parts by weight of Wisdom wheat flour, 35 parts by weight of sugar, 2.7 parts by weight of yeast, and 80 parts by weight of waters. The brew was mixed and allowed to ferment at ambient temperature (about 67° F.), for about 12 hours, whereupon it was added to the other ingredients.

The extrusion apparatus included a Wenger Model MDL 2 DDC preconditioner and a TX-52 twin screw extruder. The preconditioner was equipped with only one row of paddles on the small shaft, whereas the large shaft had all paddles in place. The extruder was made up of five heads, namely Parts Nos. 55316-001 (inlet head), 55307-001 (heads 2-4) and 55319-001 (conical final head). The screws were configured with Wenger Parts Nos., from inlet to outlet, 55326-403, 55395-003, 55325-001, 55325-103, 55324-103F., 55324-101F., 55324-103F., 55325-103R, 55325-003, 55364-101O, 55364-107+, 55325-103R, 55326-007, 55326-007, 55364-101O, 55364-107+, and 55387-005. The final die consisted of Wenger Parts Nos. 74010-271 (die spacer), 55372-103 (final die), and 31450-263 (two final die inserts). A Model 4800 Wenger dryer/cooler was used to process the extrudate with temperature settings in zones 1-3 of 200° F.; retention times were 0.9, 3.1 and 1.6 minutes in the first pass, second pass, and cooler, respectively. The bed depth in the first and second passes was 0.25 inches. Fan speed in all zones was 1,000 rpm.

The extrusion and drying were carried out as described in Example 1, and the conditions recorded for these Runs are set forth in the following table:

TABLE 3

| EXTRUDER | | RUN #4 | RUN #5 | RUN #6 | RUN #7 | RUN #8 | RUN #9 | RUN #10 | RUN #11 |
|---|---|---|---|---|---|---|---|---|---|
| RAW MATERIAL INFORMATION | | | | | | | | | |
| Feed Screw Speed | RPM | 18.00 | 18.00 | 18.00 | 18.00 | 18.00 | 18.00 | 9.00 | 8.00 |
| PRECONDITIONING INFORMATION | | | | | | | | | |
| Mixing Cylinder Speed | RPM | 200 | 200 | 200 | 200 | 200 | 200 | 200 | 200 |
| Water Flow to Mixing Cylinder | PPM | 0.426 | 0.271 | — | 0.271 | 0.386 | 0.355 | — | — |
| Mixing Cylinder Temperature | °C. | 63.00 | 64.00 | 64.00 | 64.00 | — | — | — | — |
| Moisture Entering Extruder | MCWB | 27.65 | 27.81 | 26.16 | 22.55 | 22.08 | 27.31 | — | — |
| EXTRUSION INFORMATION | | | | | | | | | |
| Extruded Shaft Speed | RPM | 405 | 380 | 403 | 400 | 400 | 385 | 405 | 410 |
| Motor Load | % | 45 | 34 | 37 | 46 | 45 | — | 30 | 29 |
| Water Flow to Extruder | PPM | 0.283 | 0.133 | 0.166 | 1.375 | 0.266 | 0.083 | — | — |
| Control/Temperature 2nd Head | °C. | CW/54 | CW/55 | CW/55 | CW/55 | CW/55 | CW/56 | CW/60 | CW/108 |
| Control/Temperature 3rd Head | °C. | CW/75 | CW/64 | CW/67 | CW/68 | CW/73 | CW/70 | CW/115 | CW/191 |
| Control/Temperature 4th Head | °C. | CW/102 | CW/113 | CW/124 | CW/126 | CW/119 | CW/120 | CW/218 | CW/211 |
| Control/Temperature 5th Head | °C. | CW/126 | CW/146 | CW/153 | CW/157 | CW/151 | CW/155 | CW/162 | CW/213 |
| Head/Pressure | PSIG | 300 | 300 | 300 | 300 | 300 | 300 | — | — |
| Head/Pressure | PSIG | 75 | 75 | 75 | 75 | — | — | — | — |
| FINAL PRODUCT INFORMATION: | | | | | | | | | |
| Extrudate Moisture | MCWB | 28.00 | 28.15 | 27.61 | 25.02 | 29.17 | 31.92 | 30.61 | 33.56 |
| Extrudate Rate (Wet) | PPH | 222.00 | 222.00 | 222.00 | — | — | — | — | — |
| Extrudate Density (Dry) | lbs/ft$^3$ | 17.00 | 14.00 | 18.00 | — | 18.50 | 17.00 | 17.50 | — |

The breadings derived from Runs 4, 5 and 9–11 containing active dry yeast or the fermented yeast brew were all satisfactory and eliminated the problem of frosty tips. The remaining Runs which contained no yeast were not successful products and did exhibit the frosty tip phenomenon. This establishes the importance of active yeast in preparing acceptable breading products.

I claim:

1. A method of preparing a breading product, consisting essentially of the steps of:

providing a moisturized breading mixture including a major proportion of wheat flour therein, and individual amounts of active yeast and water, said mixture-providing step consisting essentially of the steps of first providing starting ingredients consisting essentially of from about 90–98% by weight wheat flour, and from about 0.1–5% by weight of active yeast, and thereafter creating said moisturized breading mixture by passing said starting ingredients into and through a preconditioner while adding moisture thereto to achieve a moisture content of from about 20–35% by weight, and during passage of said starting ingredients and moisture through said preconditioner, subjecting the mixture thereof to a maximum temperature of up to about 100° C. and a retention time in the preconditioner of up to about 3 minutes;

passing the moisturized breading mixture from said preconditioner into and through an extruder to create an extrudate having a wet density of from about 11–16.5 lbs/ft$^3$, said extruder having an elongated barrel and an axially rotatable screw within said barrel, and an endmost extrusion die, said extrusion being carried out at temperature, pressure and residence time conditions within the extruder barrel during such passage at levels of up to about 250° F., up to about 400 psi, and from about 10–45 seconds, respectively; and drying the extrudate to a moisture content of from about 8–12% by weight, said drying step consisting essentially of the steps of first allowing said extrudate to set in ambient air for a period of from about 5–30 seconds, thereafter shredding the set extrudate, and then subjecting said shredded extrudate to drying air currents having a temperature of from about 160°–250° F. for a period to create a breading having said moisture content and a bulk density of from about 8–19 lbs/ft$^3$.

2. The method of claim 1, said active yeast being in the form of dried active yeast.

3. The method of claim 1, said active yeast being in the form of a fermented yeast brew.

4. The method of claim 1, said mixture including minor amounts of salt and dextrose.

* * * * *